(12) United States Patent
Cher et al.

(10) Patent No.: US 8,489,217 B2
(45) Date of Patent: Jul. 16, 2013

(54) THERMAL CYCLING AND GRADIENT MANAGEMENT IN THREE-DIMENSIONAL STACKED ARCHITECTURES

(75) Inventors: Chen-Yong Cher, Port Chester, NY (US); Wilfried E. Haensch, Somers, NY (US); Eren Kursun, Ossining, NY (US); David R. Motschman, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 358 days.

(21) Appl. No.: 12/984,096

(22) Filed: Jan. 4, 2011

(65) Prior Publication Data

US 2012/0173036 A1 Jul. 5, 2012

(51) Int. Cl.
*G06F 19/00* (2011.01)
(52) U.S. Cl.
USPC .............................. 700/98; 702/132; 374/133
(58) Field of Classification Search
USPC .............. 700/96–98, 121, 123; 702/132, 130; 374/133, 185, 137; 527/457, 424
See application file for complete search history.

(56) References Cited

U.S. PATENT DOCUMENTS

| 5,502,838 | A | 3/1996 | Kikinis |
| 6,786,639 | B2 * | 9/2004 | Covi et al. ..................... 374/178 |
| 6,966,693 | B2 * | 11/2005 | Prakash et al. ................ 374/163 |
| 7,050,959 | B1 | 5/2006 | Pollard, II et al. |
| 7,444,260 | B2 | 10/2008 | Raad |
| 7,487,012 | B2 * | 2/2009 | Bose et al. .................... 700/300 |
| 7,510,323 | B2 * | 3/2009 | Rahman et al. ................ 374/163 |
| 7,555,411 | B2 * | 6/2009 | Wang et al. .................... 702/188 |
| 7,587,692 | B2 | 9/2009 | Chandra |
| 7,946,763 | B2 * | 5/2011 | Rahman et al. ................ 374/185 |
| 2007/0152674 | A1 | 7/2007 | Hubbell |
| 2007/0244676 | A1 | 10/2007 | Shang et al. |
| 2009/0019411 | A1 | 1/2009 | Chandra et al. |
| 2009/0135553 | A1 * | 5/2009 | Bao ............................. 361/679.4 |
| 2009/0288425 | A1 | 11/2009 | Phan et al. |

OTHER PUBLICATIONS

"Closed-Loop 3D Voltage Regulation Using Digital Process Sensors", IPCOM000194419D, Mar. 23, 2010, 4 pages.
Sohn, Kyomin et al., "An Autonomous SRAM with On-Chip Sensors in an 80-nm Double Stacked Cell Technology", IEEE Journal of Solid-State Circuits, vol. 41, No. 4, Apr. 2006, pp. 823-830.
Yu, Hao et al., "Thermal Via Allocation for 3D ICs Considering Temporally and Spatially Variant Thermal Power", ISLPED, Oct. 4-6, 2006, pp. 156-161.

* cited by examiner

*Primary Examiner* — Kidest Bahta
(74) *Attorney, Agent, or Firm* — Francis Lammes; Stephen J. Walder, Jr.; William J. Stock

(57) ABSTRACT

A mechanism is provided for minimizing reliability problems in a three-dimensional (3D) integrated circuit. A set of sensors are interrogated for current data. A direction of force and a magnitude of the force are determined based on the current data for each sensor in the set of sensors for each of one or more directions between the sensor and at least one neighboring sensor thereby forming a set of forces. Each of the set of forces is used to identify one or more points of stress that are at or above the predetermined force threshold. Responsive to identifying at least one point of stress that is at or above the predetermined force threshold, one or more temperature actuation actions are initiated in order to reduce at least one point of stress in the region where the at least one point of stress is identified.

21 Claims, 7 Drawing Sheets

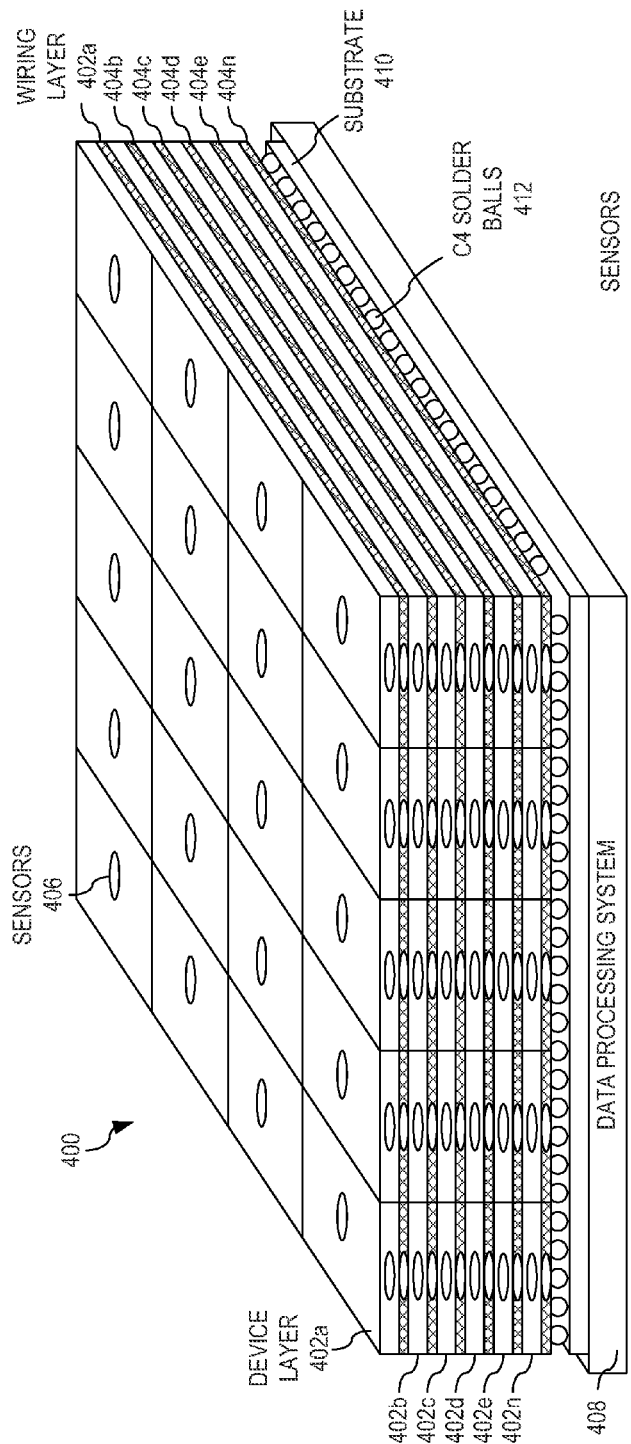
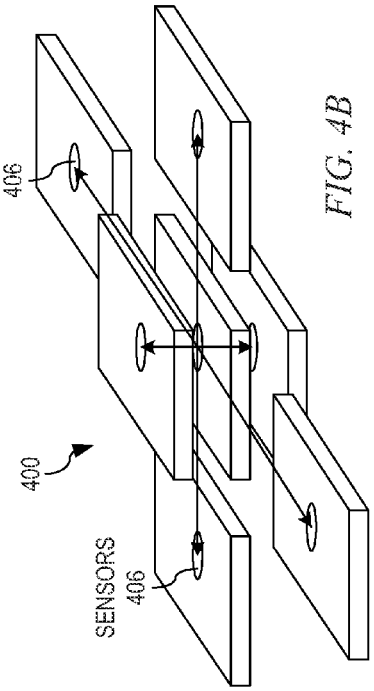
FIG. 4A
FIG. 4B

THERMAL CYCLING AND GRADIENT MANAGEMENT IN THREE-DIMENSIONAL STACKED ARCHITECTURES

BACKGROUND

The present application relates generally to an improved data processing apparatus and method and more specifically to mechanisms for thermal cycling and gradient management in three-dimensional stacked architectures.

Reliability and thermal characteristics of three-dimensional (3D) integrated circuits are considered among the most important challenges in current computing systems. 3D integrated circuits present unique thermal challenges due to differences in geometry, power dissipation, and heat removal patterns. 3D integrated circuits exhibit higher temperatures and more prominent thermal gradients within the layers, as well as new vertical thermal gradients that do not exist in two-dimensional (2D) integrated circuits. A thermal gradient is a rate of temperature change with distance. The combination of higher temperatures and thermal gradients exacerbate reliability problems in the stacked architectures.

Thermal cycling, that is, how temperature changes over time, also becomes an important challenge in this setting due to various reasons, such as:
1. Thinned silicon (Si) causes inherent mechanical and reliability challenges.
2. Increased number of neighbors, resulting in more complex heat and thermal cycling effects.
3. Combination of different materials used, such as Copper (Cu), Silicon (Si), Tungsten (W), oxides, dielectrics, or the like, with different thermal expansion and mechanical characteristics.
4. Thermal expansion prominent in different directions in all dimensions, specifically vertical expansion that could break the horizontal back-end (BE) wires.

As activity levels fluctuate across computing units in 3D integrated circuits, thermal cycling effects threaten the reliability of 3D integrated circuit architectures more than 2D integrated circuit counterparts due to the above reasons. Without specialized techniques, 3D integrated circuits are prone to reliability problems caused by thermal cycling.

Moreover, most thermal management techniques in a 3D integrated circuits attempt to invert the heating patterns in consecutive layers in the 3D integrated circuit architecture as an attempt to minimize the peak temperatures. As the hotspot regions align, the corresponding temperatures increase even further since the heat cannot be drained to the heat sink through vertically overlapping blockages. A major side effect of such thermal management is that the thermal management creates severe thermal gradients in vertical and horizontal directions, both between neighbor blocks on the same layer and the block that are neighbors in a vertical direction. The inverted heating patterns make thermal cycling and mechanical stress effects even worse because the inverted heating patterns maximize the mechanical forces in the opposite directions, which can cause warping and cracking. Even further, through silicon via (TSV) and wiring layers are perpendicular to each other and any expansion of TSVs can easily crack the silicon and wiring layers that the TSVs make contact with.

SUMMARY

In one illustrative embodiment, a method, in a data processing system, is provided for minimizing reliability problems in a three-dimensional (3D) integrated circuit. The illustrative embodiment interrogates a set of sensors for current data in the 3D integrated circuit. In the illustrative embodiment, the 3D integrated circuit comprises two or more layers of active electronic components. The illustrative embodiment determines a direction of force and a magnitude of the force based on the current data for each sensor in the set of sensors for each of one or more directions between the sensor and at least one neighboring sensor within the 3D integrated circuit architecture thereby forming a set of forces. The illustrative embodiment uses the set of forces to identify one or more points of stress that are at or above the predetermined force threshold. Responsive to identifying at least one point of stress that is at or above the predetermined force threshold, the illustrative embodiment initiates one or more temperature actuation actions within the 3D integrated circuit in order to reduce the at least one point of stress in the region where the at least one point of stress is identified.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIGS. 4A and 4B depict an exemplary illustration of a three-dimensional (3D) integrated circuit architecture with a plurality of sensors in accordance with an illustrative embodiment;

DETAILED DESCRIPTION

The impact of mechanical stress and thermal cycling in three-dimensional (3D) integrated circuit architectures affects the overall reliability and efficiency characteristics of such devices. The illustrative embodiments provide a mechanism for a specialized thermal management technique that minimizes reliability problems that result from mechanical stress and thermal cycling. The illustrative embodiments utilize a sensor infrastructure to keep track of temperatures within the 3D integrated circuit architecture, which may be referred to as in-stack temperatures, at run-time. The illustrative embodiments estimate thermal gradients (Delta_Ts or ΔTs) and corresponding mechanical stress levels for different regions in the 3D integrated circuit architecture. After determining forces that are being experienced within the 3D integrated circuit architecture for both static and cycling stress, the illustrative embodiments adjusts different parameters within the 3D integrated circuit architecture in order to minimize corresponding three vectors.

Figure 1:
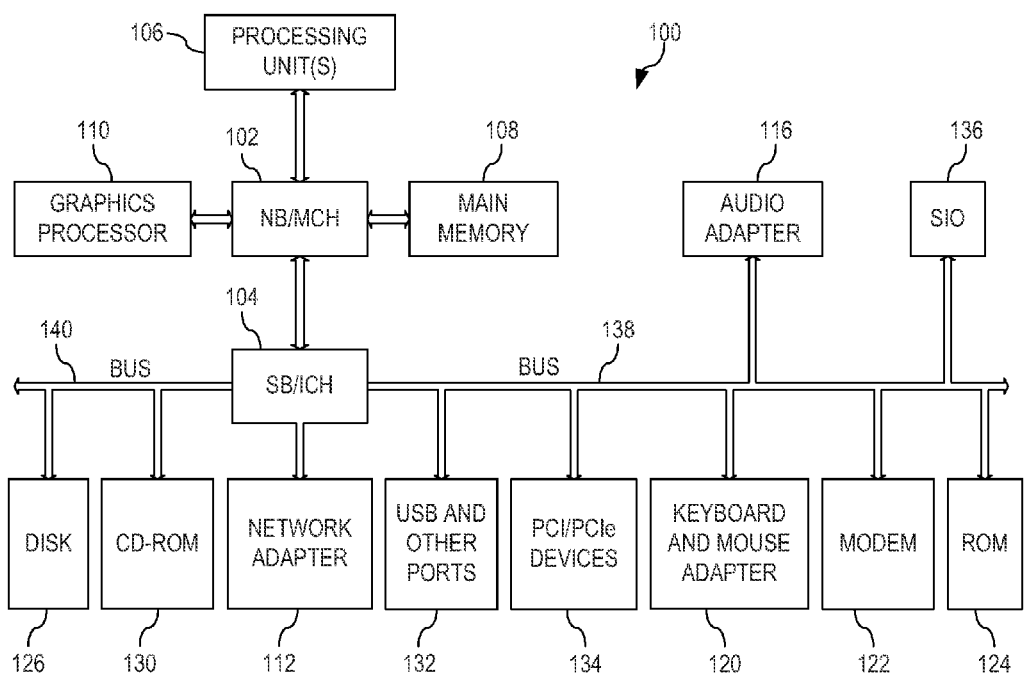
FIG. 1 depicts an example diagram of a data processing environment in which illustrative embodiments of the present invention may be implemented.

Thus, the illustrative embodiments may be utilized in many different types of data processing environments including a distributed data processing environment, a single data processing device, or the like, in order to provide a context for the description of the specific elements and functionality of the illustrative embodiments, FIG. 1 is provided hereafter as an example environment in which aspects of the illustrative embodiments may be implemented. While the description following FIG. 1 will focus primarily on a single data processing device implementation of a mechanism that minimizes the reliability problems that result from mechanical stress and thermal cycling, this is only an example and is not intended to state or imply any limitation with regard to the features of the present invention. To the contrary, the illustrative embodiments are intended to include distributed data processing environments and embodiments in which specialized thermal management techniques are utilized to minimize the reliability problems that result from mechanical stress and thermal cycling.

With reference now to the figures and in particular with reference to FIG. 1, an example diagram of a data processing environment is provided in which illustrative embodiments of the present invention may be implemented. It should be appreciated that FIG. 1 is only an example and is not intended to assert or imply any limitation with regard to the environments in which aspects or embodiments of the present invention may be implemented. Many modifications to the depicted environments may be made without departing from the spirit and scope of the present invention.

With reference now to FIG. 1, a block diagram of an example data processing system is shown in which aspects of the illustrative embodiments may be implemented. Data processing system 100 is an example of a computer in which computer usable code or instructions implementing the processes for illustrative embodiments of the present invention may be located.

In the depicted example, data processing system 100 employs a hub architecture including north bridge and memory controller hub (NB/MCH) 102 and south bridge and input/output (I/O) controller hub (SB/ICH) 104. Processing unit 106, main memory 108, and graphics processor 110 are connected to NB/MCH 102. Graphics processor 110 may be connected to NB/MCH 102 through an accelerated graphics port (AGP).

In the depicted example, local area network (LAN) adapter 112 connects to SB/ICH 104. Audio adapter 116, keyboard and mouse adapter 120, modem 122, read only memory (ROM) 124, hard disk drive (HDD) 126, CD-ROM drive 130, universal serial bus (USB) ports and other communication ports 132, and PCI/PCIe devices 134 connect to SB/ICH 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash basic input/output system (BIOS).

HDD 126 and CD-ROM drive 130 connect to SB/ICH 104 through bus 140. HDD 126 and CD-ROM drive 130 may use, for example, an integrated drive electronics (IDE) or serial advanced technology attachment (SATA) interface. Super I/O (SIO) device 136 may be connected to SB/ICH 104.

An operating system runs on processing unit 106. The operating system coordinates and provides control of various components within the data processing system 100 in FIG. 1. As a client, the operating system may be a commercially available operating system such as Microsoft® Window® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 100 (Java is a trademark of Sun Microsystems, Inc. in the United States, other countries, or both).

As a server, data processing system 100 may be, for example, an IBM® eServer™ System P® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 100 may be a symmetric multiprocessor (SMP) system including a plurality of processors in processing unit 106. Alternatively, a single processor system may be employed.

Instructions for the operating system, the object-oriented programming system, and applications or programs are located on storage devices, such as HDD 126, and may be loaded into main memory 108 for execution by processing unit 106. The processes for illustrative embodiments of the present invention may be performed by processing unit 106 using computer usable program code, which may be located in a memory such as, for example, main memory 108, ROM 124, or in one or more peripheral devices 126 and 130, for example.

A bus system, such as bus 138 or bus 140 as shown in FIG. 1, may be comprised of one or more buses. Of course, the bus system may be implemented using any type of communication fabric or architecture that provides for a transfer of data between different components or devices attached to the fabric or architecture. A communication unit, such as modem 122 or network adapter 112 of FIG. 1, may include one or more devices used to transmit and receive data. A memory may be, for example, main memory 108, ROM 124, or a cache such as found in NB/MCH 102 in FIG. 1.

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the illustrative embodiments my be applied to a multiprocessor data processing system without departing from the spirit and scope of the present invention.

Moreover, the data processing system 100 may take the form of any of a number of different data processing systems including client computing devices, server computing devices, a tablet computer, laptop computer, telephone or other communication device, a personal digital assistant (PDA), or the like. In some illustrative examples, data processing system 100 may be a portable computing device which is configured with flash memory to provide non-volatile memory for storing operating system files and/or user-generated data, for example. Essentially, data processing system 100 may be any known or later developed data processing system without architectural limitation.

In order to minimize reliability problems created by mechanical stress and thermal cycling, the illustrative embodiments provide a specialized thermal management technique relies on a sensor infrastructure to keep track of the on-stack temperatures in three-dimensional (3D) integrated circuit architectures at run-time. The illustrative embodiments estimate thermal gradients and corresponding mechanical stress levels for different regions in the stack. After determining the opposing forces for both static and cycling stress, the illustrative embodiments then adjusts parameters, such as voltage, frequency, workload, or the like to minimize the corresponding opposing forces. That is, the illustrative embodiments perform counter intuitive steps, such as increasing activity levels and corresponding heating levels of cooler areas to minimize the thermal gradients both spatially and temporally.

Figure 2:
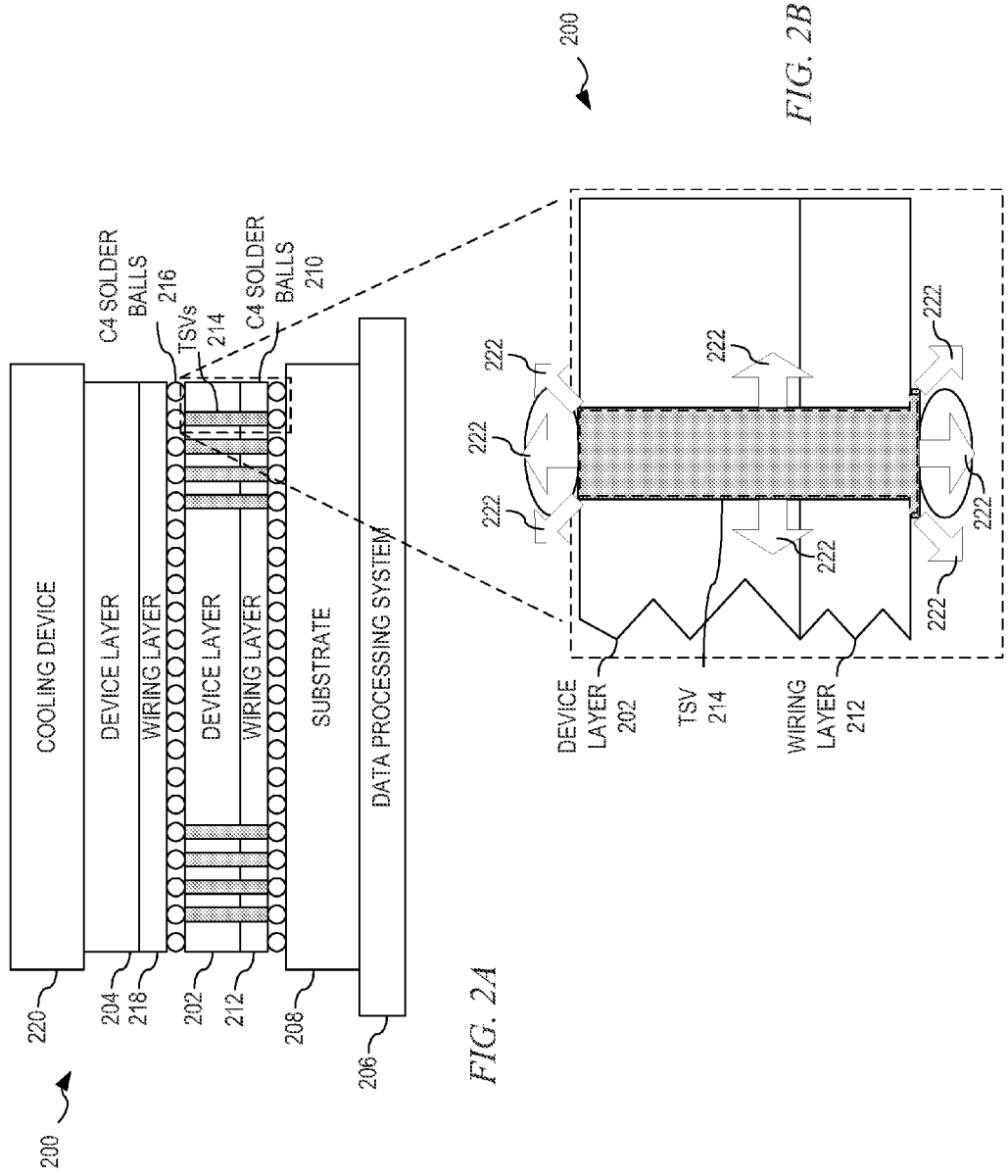
FIGS. 2A and 2B depict an exemplary illustration of a three-dimensional (3D) integrated circuit architecture in accordance with an illustrative embodiment.

FIGS. 2A and 213 depict an exemplary illustration of a three-dimensional (3D) integrated circuit architecture in accordance with an illustrative embodiment. In FIG. 2A, three-dimensional (3D) architecture 200 comprises device layers 202 and 204 that may comprise active electronic components or devices, such as a plurality of processor cores, register files, arrays, or other functional units where operations may be performed. Data processing system 206 may provide power (Vdd), ground, signaling, input/output (I/O), or the like, to device layer 202 via substrate 208, a first plurality of C4 solder balls 210, and wiring layer 212. Data processing system 206 may provide power (Vdd), ground, signaling, input/output (I/O), or the like, to device layer 204 via substrate 208, the first plurality of C4 solder balls 210, through silicon via (TSVs) 214, a second plurality of C4 solder balls 216, and wiring layer 218. Heat may be removed from 3D architecture 200 by cooling device 220, which may be a cold plate, a heat sink, or the like, coupled to device layer 204.

In FIG. 2B, which is a magnified portion of 3D architecture 200, as the temperature within 3D architecture 200 increases, the material, such as Copper (Cu), Silicon (Si), Tungsten (W), or the like, within a particular layer may exhibit thermal expansion. For example, in FIG. 2B, TSV 214 has been heated due to operations being performed in device layer 202, such that TSV 214 has expanded outward, upward, downward, diagonally, or the like, indicated by arrows 222. Such thermal expansion, as is illustrated by arrows 222, could break wires within wiring layer 212 or cause other damage to either device layer 202 or wiring layer 212.

Figure 3:
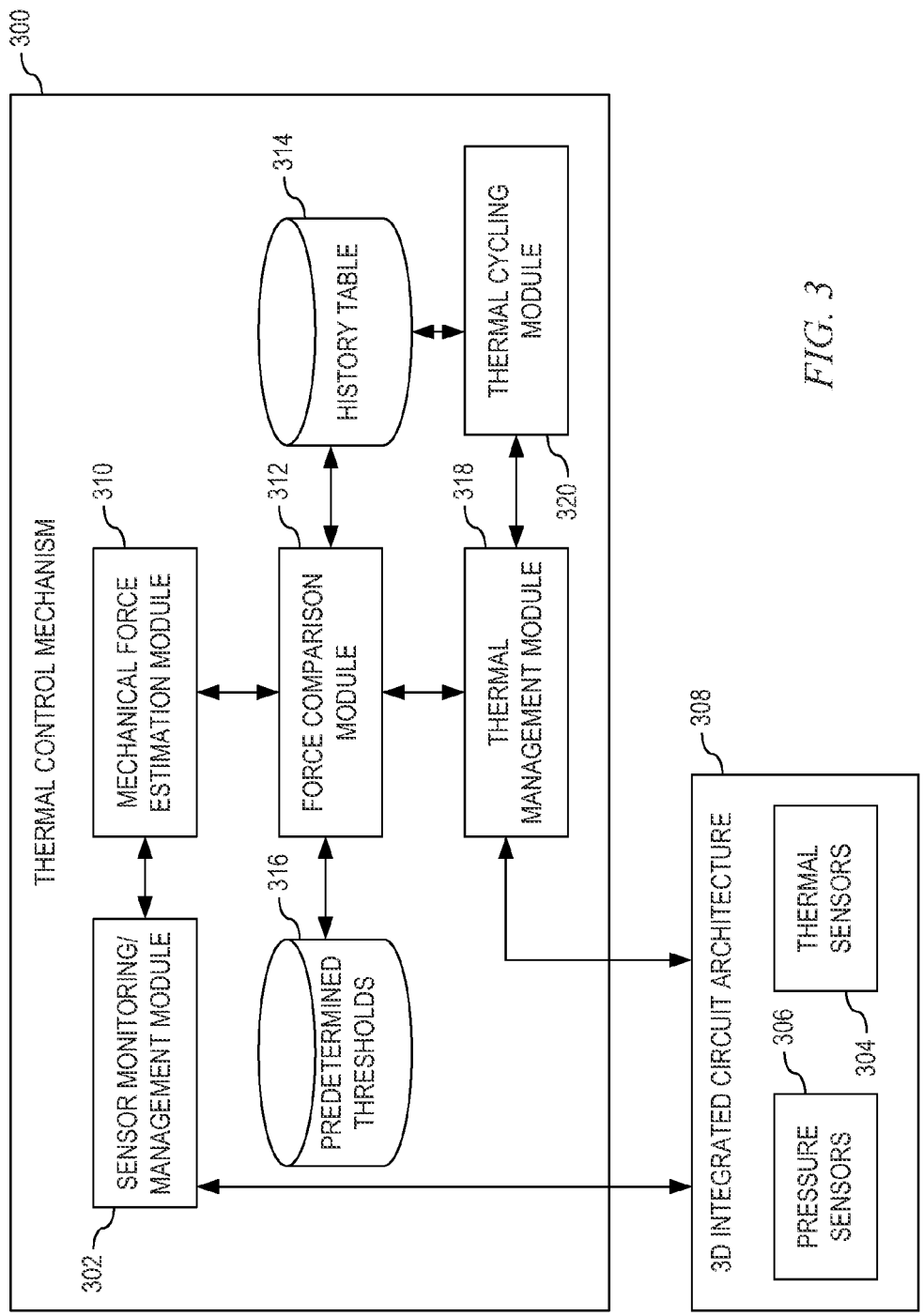
FIG. 3 depicts a block diagram of a mechanism to minimize reliability problems created by mechanical stress and thermal cycling in three-dimensional (3D) integrated circuit architectures in accordance with an illustrative embodiment.

FIG. 3 depicts a block diagram of a mechanism to minimize reliability problems created by mechanical stress and thermal cycling in three-dimensional (3D) integrated circuit architectures in accordance with an illustrative embodiment. In order to implement the specialized thermal management technique of the illustrative embodiments, thermal control mechanism 300, which may reside within or be associated with a data processing system such as data processing system 100 of FIG. 1, utilizes sensor monitoring and measurement module 302 to monitor a set of thermal sensors 304 and/or a set of pressure sensors 306 that resides within 3D integrated circuit architecture 308. Thermal sensors 304 and pressure sensors 306 may be either digital or analog sensors and each sensor may be associated with a region of the 3D integrated circuit architecture 308. That is, 3D integrated circuit architecture 308 may be divided into regions horizontally within a specific device layer or wiring layer as well as being divided into regions vertically through the stack formed by the various device layers and wiring layers within 3D integrated circuit architecture 308.

Either at predetermined times or predetermined time intervals and if 3D integrated circuit architecture 308 is equipped with pressure sensors 306, sensor monitoring and measurement module 302 interrogates pressure sensors 306 within 3D integrated circuit architecture 308 in order to obtain current data relating to the mechanical forces being experienced in each region with which each of pressure sensors 306 is associated. Each of pressure sensors 306 is either vertically or horizontally aligned in 3D integrated circuit architecture 308 and collect pressure readings during run time. If 3D integrated circuit architecture 308 fails to be equipped with pressure sensors 306, sensor monitoring and measurement module 302 interrogates thermal sensors 304 in order to obtain current data relating to temperatures within the 3D integrated circuit architecture. As each temperature reading is obtained, then, for each pair of thermal sensors 304, mechanical force estimation module 310 calculates thermal gradients (ΔTs) in one or more directions, such as sides, upward, downward, diagonally, or the like, based on the temperature obtained between a temperature measured by the thermal sensor associated with the device and temperatures associated with neighboring thermal sensors.

Using the thermal gradients (ΔTs), mechanical force estimation module 310 estimates both a direction of force and a magnitude of the force between each neighboring pair of thermal sensors within 3D integrated circuit architecture 308. For a particular thermal sensor, there may be a maximum of twenty-six thermal gradients including a side (4), top (1), bottom (1), and all diagonals (20). Strength of a mechanical force is directly proportional to a thermal gradient between two layers or two regions within 3D integrated circuit architecture 308. Material characteristics, specifically, coefficients of thermal expansion, may make a significant difference. Materials such as copper expand significantly more than materials such as tungsten, thus these materials create stress and/or force in a proportional manner based on thermal gradient. Thus, the thermal expansion of a device within 3D integrated circuit architecture 308 may be determined using a thermal expansion equation, such as:

$$\Delta L = \alpha \cdot Lo \cdot \Delta T$$

where $\Delta L$ is the expansion, $\alpha$ is the linear expansion coefficient (meters/meters degrees Kelvin, inches/inches degrees Fahrenheit), Lo=original length of the device length of pipe (meters, inches), and $\Delta t$=temperature difference (Celsius, Fahrenheit). Depending on the dimensions of the structures/geometry, mechanical force estimation module 310 may use either a length expansion, as is illustrated above, or volume expansion. Length expansion may be more appropriate for TSV and other vias and volume expansion for microC4 (μC4)

or other interlayer bumps. Mechanical stress induced by a length change ΔL may be determined using a stress formula such as:

$$F/A = Y \cdot \Delta L/Lo$$

where F is the force applied to a device, A is the cross-section area of the device, Lo is the initial length of the device, ΔL is the change in length of the device and coefficient Y is called Young's modulus. Young's modulus depends only on the material the device is made of, but is independent of size or shape of the device.

Using the mechanical forces read from each of pressure sensors 306 or using the mechanical forces determined based on temperatures read from temperature sensors 304, mechanical force estimation module 310 identifies points of potential stress on devices within 3D integrated circuit architecture 308. That is, mechanical force estimation module 310 identifies mechanical forces with conflicting directions of force vectors (e.g. <−2, +1, −1, 0, . . . >) to identify points of potential stress on devices within 3D integrated circuit architecture 308, such as functional units, wiring layers, device layers, or the like. Mechanical force estimation module 310 then stores the collection of stress, force, temperature vectors, or the like, identified for each sensor, whether pressure sensor 306 or temperature sensor 304, in history table 314 for subsequent thermal cycling analysis.

Force comparison module 312 then compares the estimated forces with predetermined force thresholds for the area associated with the sensor in 3D integrated circuit architecture 308. The predetermined force thresholds may be stored in predetermined thresholds 316 in an on-chip look-up table within thermal control mechanism 300. If force comparison module 312 identifies points of stress (above the predetermined force threshold), then force comparison module 312 notifies thermal management module 318 to minimize force patterns of conflicting directions. That is, thermal management module 318 minimizes MAX force and stress vector values in 3D integrated circuit architecture 308 by initiating temperature actuation actions, such as placing higher activity/temperature computation in lower temperature regions within 3D integrated circuit architecture 308 thereby reducing the workload within regions of 3D integrated circuit architecture 308 where the point of stress is occurring, reducing voltage and/or operating frequencies within regions of 3D integrated circuit architecture 308 where the point of stress is occurring, or other similar temperature actuation actions.

FIGS. 4A and 4B depict an exemplary illustration of a three-dimensional (3D) integrated circuit architecture with a plurality of sensors in accordance with an illustrative embodiment. In FIG. 4A, three-dimensional (3D) architecture 400 comprises a plurality of device layers 402a-402n and a plurality of wiring layers 404a-404n. Again, the plurality of device layers 402a-402n may comprise a plurality of processor cores, register files, arrays, or other functional units where operations may be performed. Data processing system 408 may provide power (Vdd), ground, signaling, input/output (I/O), or the like, to the plurality of device layers 402a-402n via a substrate 410, one or more sets of C4 solder balls 412, one or more sets of through silicon via (TSVs) (not shown), and the plurality of wiring layers 404a-404n. In accordance with the illustrative embodiments, 3D architecture 400 also comprises a plurality of sensors 406. The plurality of sensors 406 may be either a plurality of thermal sensors, a plurality of pressure sensors, and or a combination of thermal sensors and pressure sensors. The plurality of sensors 406 may be located within 3D architecture 400 such that each of the plurality of sensors may provide data associated with a specific device, such as a processor, a memory device, a TSV, or other devices that may be affected by thermal expansion. Additionally, the plurality of sensors 406 may be associated with regions both horizontally within a specific one of the plurality of device layers 402a-402n or plurality of wiring layers 404a-404n as well as vertically between the plurality of device layers 402a-402n and the plurality of wiring layers 404a-402n within 3D architecture 400.

In FIG. 4B, which is a magnified portion of 3D architecture 400, as the temperature within 3D architecture 400 increases, the material, such as Copper (Cu), Silicon (Si), Tungsten (W), or the like, associated with the devices, within a particular layer may exhibit thermal expansion or be affected by thermal expansion. As described in FIG. 3, in order to minimize reliability problems created by mechanical stress and thermal cycling in 3D architecture 400, a sensor monitoring and measurement module within a temperature control mechanism monitors the plurality of sensors 406 to obtain thermal or pressure data from the plurality of sensors 406 that may be used to determine mechanical forces being experienced by the devices in order to determine thermal gradients or pressure forces from one sensor to all neighboring sensors as is shown in FIG. 4B.

Returning to FIG. 3, the following is an example of the process of minimizing reliability problems created by mechanical stress on a particular device in the plurality of devices that may reside within a 3D architecture using the mechanisms described in FIG. 3. For the particular device, sensor monitoring and measurement module 302 monitors, for example, the set of thermal sensors 304. As is discussed previously, if 3D integrated circuit architecture 308 is equipped with pressure sensors 306 the process of obtaining the mechanical forces is minimized. Either at predetermined times or predetermined time intervals, sensor monitoring and measurement module 302 interrogates thermal sensors 304 in order to obtain current data relating to temperatures within the 3D integrated circuit architecture 308. As each temperature reading is obtained, then, for a particular device, mechanical force estimation module 310 determines thermal gradients (ΔTs) in one or more directions, such as sides, upward, downward, diagonally, or the like, based on the temperature obtained between a temperature measured by the thermal sensor associated with the device and temperatures associated with neighboring thermal sensors.

Using the thermal gradients (ΔTs), mechanical force estimation module 310 estimates both a direction of force and a magnitude of the force between each neighboring pair of thermal sensors within 3D integrated circuit architecture 308. Again, for a particular thermal sensor, there may be a maximum of twenty-six thermal gradients including a side (4), top (1), bottom (1), and all diagonals (20). That is, for example, with regard to temperature measured at the particular device and the temperature measured by the thermal sensor just above, mechanical force estimation module 310 estimates a force direction and a magnitude of force between the two thermal sensors. Similarly, as another example, with regard to temperature measured at the particular device and the temperature measured by the thermal sensor just below, mechanical force estimation module 310 estimates a force direction and a magnitude of force between the two thermal sensors. As yet another example, with regard to temperature measured at the particular device and the temperature measured by the thermal sensors to each side, mechanical force estimation module 310 estimates, for each side, a force direction and a magnitude of force between each of the two thermal sensors.

For each set of neighboring thermal sensors, force comparison module 312 compares the estimated force direction and magnitude of force with predetermined force thresholds for the area associated with the set of neighboring thermal sensors. If force comparison module 312 identifies points of stress (above the predetermined force threshold), then force comparison module 312 notifies thermal management module 318 to minimize force patterns of conflicting directions. That is, thermal management module 318 minimizes max force and stress vector values in 3D integrated circuit architecture 308 by initiating temperature actuation actions, such as placing higher activity/temperature computation in lower temperature regions within 3D integrated circuit architecture 308 thereby reducing the workload within regions of 3D integrated circuit architecture 308 where the point of stress is occurring, reducing voltage and/or operating frequencies within regions of 3D integrated circuit architecture 308 where the point of stress is occurring, or other similar temperature actuation actions.

In addition to performing force calculations and minimizing max force and stress vector values by initiating temperature actuation actions, thermal control mechanism 300 may further comprise thermal cycling module 320. Thermal cycling module 320 determines dynamic the characteristics of measured forces, estimated forces, and/or thermal gradients. That is, thermal cycling module 320 scans history table 314 to identify cases where stress and/or force with regard to a particular device was over a cycling threshold for time one (t1) and then under the cycling threshold for time two (t2) or vice versa. Stresses and/or forces in opposing directions between two time periods causing cycling. As stated previously, strength of a mechanical force is directly proportional to a thermal gradient between two layers or two regions within 3D integrated circuit architecture 308. Therefore, thermal cycling module 320 may also scan history table 314 to identify temperature patterns where temperature in one or more regions is above and below a cycling threshold or vice versa for two consecutive time periods.

Based on any thermal cycling patterns that are identified, thermal cycling module 320 estimates for each identified region of 3D integrated circuit architecture 308 one or more counter thermal cycling force vectors that would be needed to compensate for the thermal cycling pattern identified for that region. Using the estimated counter thermal cycling force vectors and any recorded force vectors in history table 314 for that region, thermal cycling module 320 estimates the thermal cycling effect of using the estimated counter thermal cycling force vectors would have on the region within 3D integrated circuit architecture 308. Based on the estimated thermal cycling effect, thermal cycling module 320 determines whether the use of the estimated counter thermal cycling force vectors would reduce the thermal cycling effect being experienced in the region by determining whether the estimated thermal cycling effect is below a predetermined thermal cycling magnitude. If the estimated thermal cycling effect is below the predetermined thermal cycling magnitude, therein there is no change needed and thermal cycling module 320 proceeds with evaluating a next region or proceeds to evaluating all of the regions at a next time period. If the estimated thermal cycling effect is at or above the predetermined thermal cycling magnitude, then thermal cycling module 320 sends a notification to thermal management module 318 with specific values in order that thermal management module 318 may implement temperature actuation actions in order to meet those values and minimizes max force and stress vector values in 3D integrated circuit architecture 308.

As will be appreciated by one skilled in the art, the present invention may be embodied as a system, method, or computer program product. Accordingly, aspects of the present invention may take the form of an entirely hardware embodiment, such as the thermal control mechanism, an entirety software embodiment (including firmware, resident software, microcode, etc.), such as a processor coupled to a memory executing instructions in the memory, or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer my be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 5:
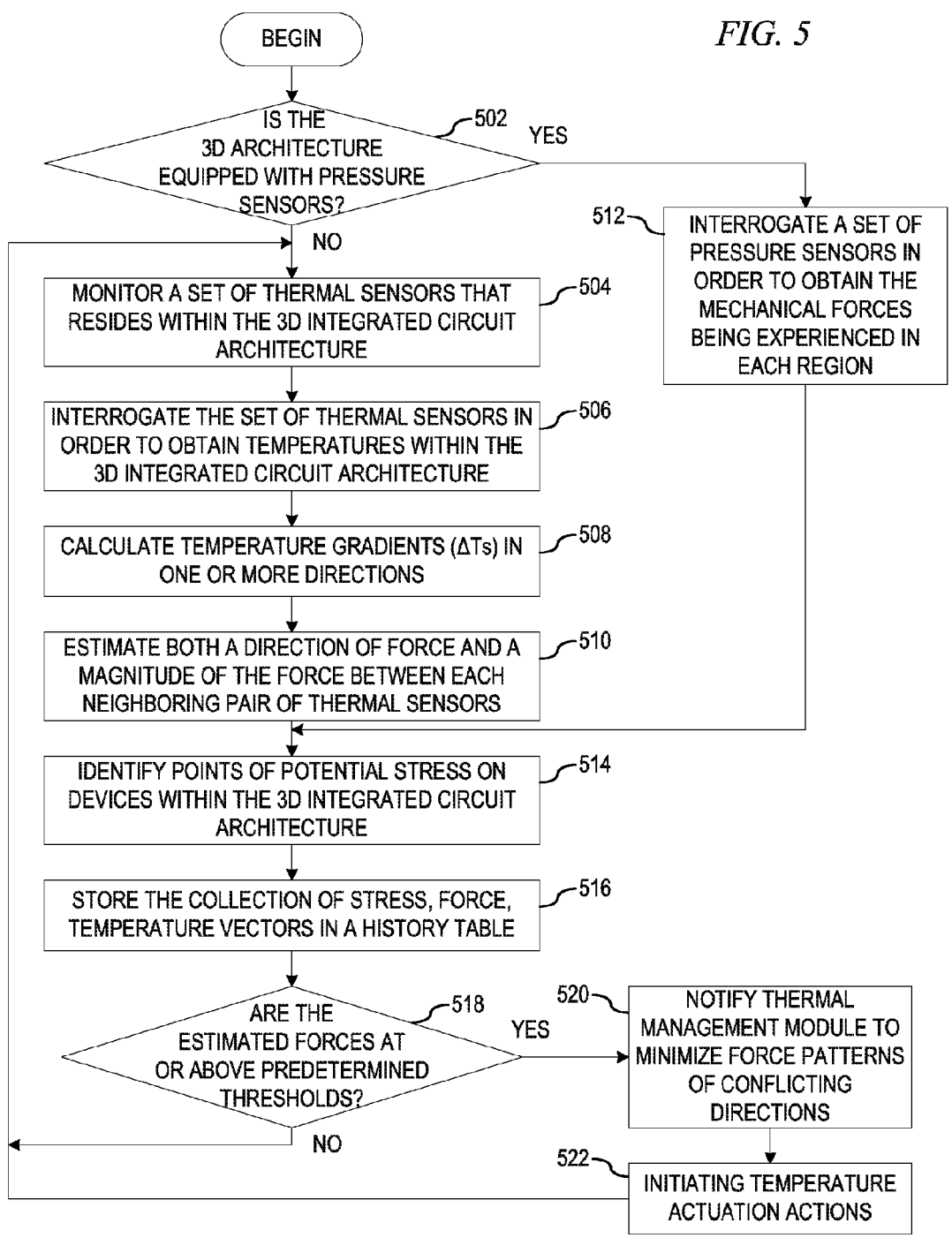
FIG. 5 depicts an example of the operation performed in minimizing reliability problems created by mechanical stress in a 3D integrated circuit architecture in accordance with an illustrative embodiment.
Figure 6:
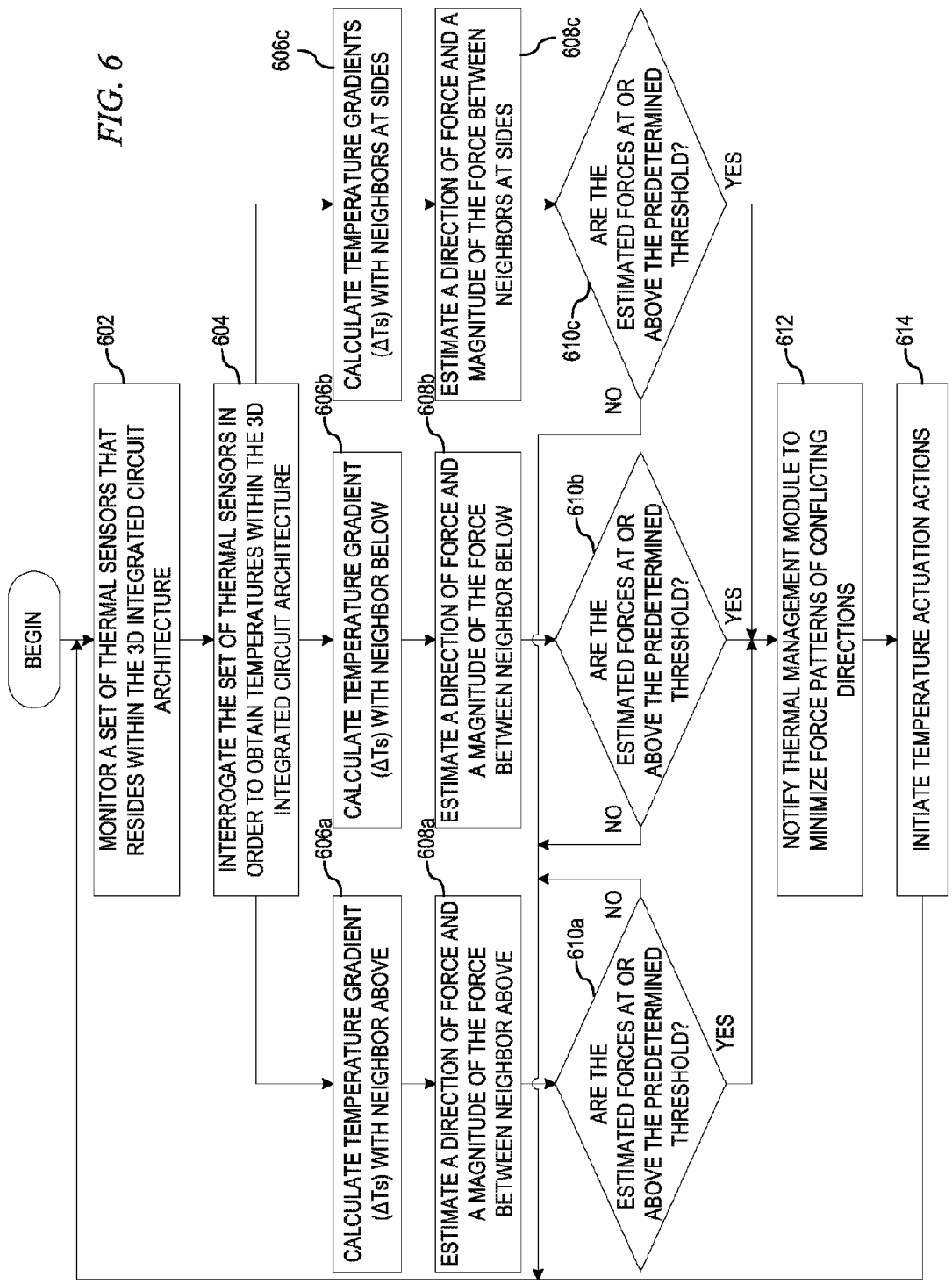
FIG. 6 depicts an example of the operation performed in minimizing reliability problems created by mechanical stress for a particular device in a 3D integrated circuit architecture in accordance with an illustrative embodiment.
Figure 7:
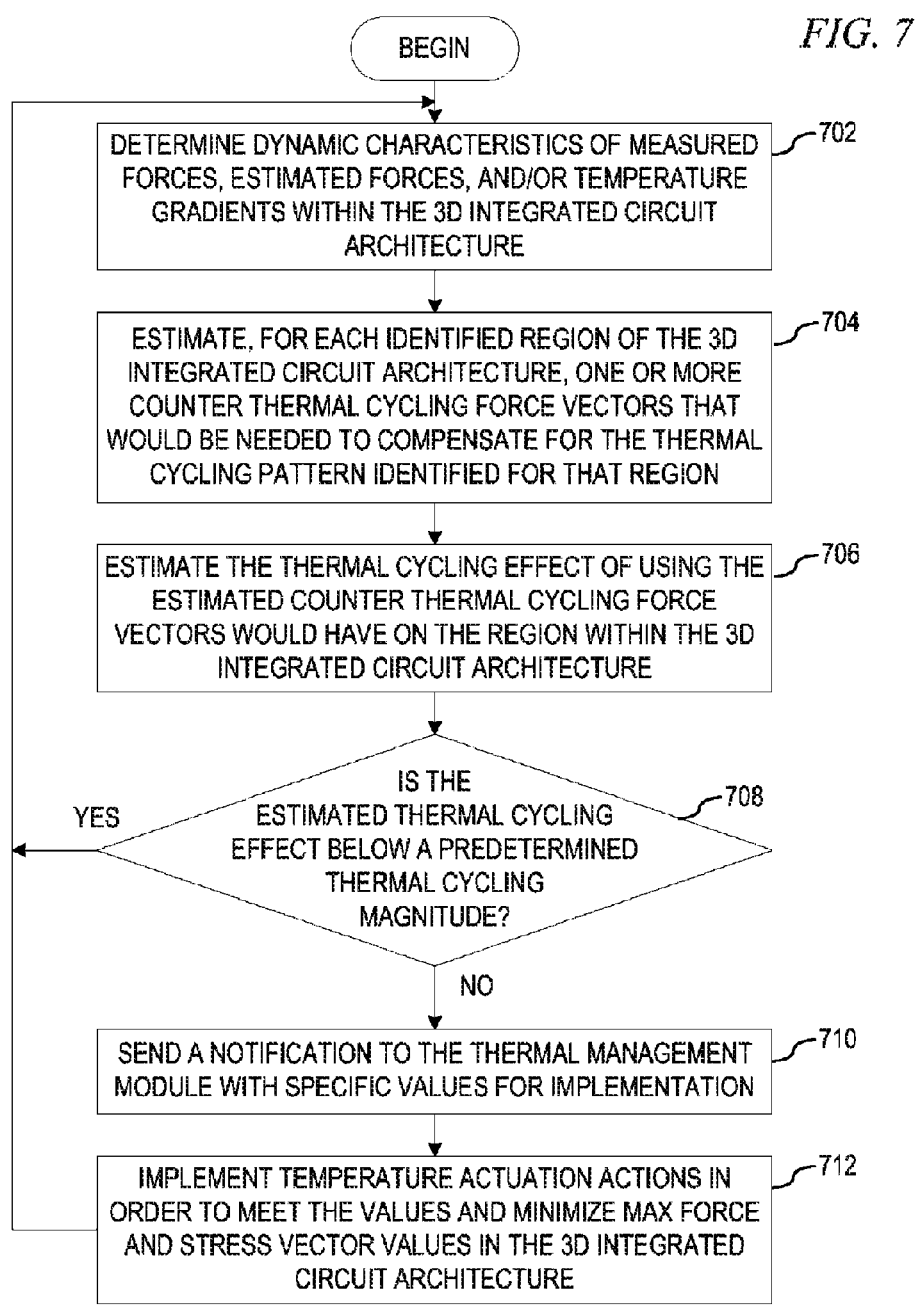
FIG. 7 depicts an example of the operation performed in minimizing reliability problems created by thermal cycling in a 3D integrated circuit architecture in accordance with an illustrative embodiment.

Referring now to FIGS. 5-7, these figures provide flowcharts outlining example operations of a thermal control mechanism minimizing reliability problems created by mechanical stress and thermal cycling in a three-dimensional (3D) integrated circuit architecture. FIG. 5 depicts an example of the operation performed in minimizing reliability problems created by mechanical stress in a 3D integrated circuit architecture in accordance with an illustrative embodiment. As the operation begins, a sensor monitoring and measurement module within the thermal management mechanism determines whether the 3D integrated circuit architecture is equipped with a set of pressure sensors (step 502). If at step 502 the sensor monitoring and measurement module determines that the 3D integrated circuit architecture is not equipped with the set of pressure sensors, then the sensor monitoring and measurement module monitors a set of thermal sensors that resides within the 3D integrated circuit architecture (step 504). Either at predetermined times or predetermined time intervals, the sensor monitoring and measurement module interrogates the set of thermal sensors in order to obtain current data relating to temperatures within the 3D integrated circuit architecture (step 506). As each temperature reading is obtained, then, for each pair of thermal sensors, a mechanical force estimation module in the thermal control mechanism calculates thermal gradients (ΔTs) in one or more directions, such as sides, upward, downward, diagonally, or the like, based on the temperature obtained between a temperature measured by the thermal sensor associated with the device and temperatures associated with neighboring thermal sensors (step 508).

Using the thermal gradients (ΔTs), the mechanical force estimation module estimates both a direction of force and a magnitude of the force between each neighboring pair of thermal sensors within the 3D integrated circuit architecture (step 510). If at step 502 the sensor monitoring and measurement module determines that the 3D integrated circuit architecture is equipped with the set of pressure sensors, then the sensor monitoring and measurement module interrogates the set of pressure sensors within the 3D integrated circuit architecture in order to obtain current data relating to the mechanical forces being experienced in each region with which each of the set of pressure sensors (step 512). From steps 510 or 512, the mechanical force estimation module uses the mechanical forces read from each of the set of pressure sensors or uses the mechanical forces determined based on temperatures read from the set of temperature sensors to identify points of potential stress on devices within the 3D integrated circuit architecture (step 514). The mechanical force estimation module then stores the collection of stress, force, temperature vectors, or the like, identified for each sensor, whether pressure sensor or temperature sensor, in a history table for subsequent thermal cycling analysis (step 516).

A force comparison module within the thermal control mechanism then compares the estimated forces with predetermined force thresholds for the area associated with the sensor in 3D integrated circuit architecture in order to identify points of stress (step 518). If at step 518 the force comparison module identifies points of stress at or above the predetermined force threshold, then the force comparison module notifies a thermal management module in the thermal control mechanism to minimize force patterns of conflicting directions (step 520). The thermal management module then minimizes max force and stress vector values in the 3D integrated circuit architecture by initiating temperature actuation actions (step 522), with the operation returning to either step 504 or step 512 thereafter depending on implementation. If at step 518 the force comparison module identifies points of stress that are below the predetermined force threshold, then the operation returns to either step 504 or step 512 depending on implementation.

FIG. 6 depicts an example of the operation performed in minimizing reliability problems created by mechanical stress for a particular device in a 3D integrated circuit architecture in accordance with an illustrative embodiment. As the operation begins a sensor monitoring and measurement module monitors, for example, a set of thermal sensors (step 602). As discussed previously, if the 3D integrated circuit architecture is equipped with a set of pressure sensors the process of obtaining the mechanical forces is minimized. Either at predetermined times or predetermined time intervals, the sensor monitoring and measurement module interrogates the set of thermal sensors in order to obtain current data relating to temperatures within the 3D integrated circuit architecture (step 604). As each temperature reading is obtained, then, for a particular device, the mechanical force estimation module determines thermal gradients (ΔTs) in one or more directions, such as to the sides, upward, downward, diagonally, or the like, based on the temperature obtained between a temperature measured by the thermal sensor associated with the device and temperatures associated with neighboring thermal sensors (steps 606a, 606b, and 606c).

Using the thermal gradients (ΔTs), a mechanical force estimation module estimates both a direction of force and a magnitude of the force between each neighboring pair of thermal sensors within the 3D integrated circuit architecture (step 608a, 608b, and 608c). That is, with regard to temperature measured at the particular device and the temperature measured by the thermal sensor just above, the mechanical force estimation module estimates a force direction and a magnitude of force between the two thermal sensors (step 608a). Similarly, with regard to temperature measured at the particular device and the temperature measured by the thermal sensor just below, the mechanical force estimation module estimates a force direction and a magnitude of force between the two thermal sensors (608b). Further, with regard to temperature measured at the particular device and the temperature measured by the thermal sensors to each side, the mechanical force estimation module estimates, for each side, a force direction and a magnitude of force between each of the two thermal sensors (step 608c). While not illustrated, with regard to temperature measured at the particular device and the temperature measured by the thermal sensors at each diagonal (20), the mechanical force estimation module estimates, for each diagonal side, a force direction and a magnitude of force between each of the two thermal sensors.

For each set of neighboring thermal sensors, a force comparison module compares the estimated force direction and magnitude of force with predetermined force thresholds for the area associated with the set of neighboring thermal sensors (steps 610a, 610b, and 610c). If at any one of steps 610a, 610b, and/or 610c the force comparison module identifies points of stress at or above the predetermined force threshold, then the force comparison module notifies the thermal management module to minimize force patterns of conflicting directions (step 612). The thermal management module then minimizes max force and stress vector values in the 3D integrated circuit architecture by initiating temperature actuation actions (step 614) with the operation returning to step 602 thereafter. If at any one of steps 610a, 610b, and/or 610c the force comparison module identifies points of stress that are below the predetermined force threshold, then the operation returns to step 602.

FIG. 7 depicts an example of the operation performed in minimizing reliability problems created by thermal cycling in a 3D integrated circuit architecture in accordance with an illustrative embodiment. As the operation begins, a thermal cycling module determines dynamic characteristics of measured forces, estimated forces, and/or thermal gradients within the 3D integrated circuit architecture (step 702). Based on any thermal cycling patterns that are identified, the thermal cycling module estimates, for each identified region of the 3D integrated circuit architecture, one or more counter thermal cycling force vectors that would be needed to compensate for the thermal cycling pattern identified for that region (step 704). Using the estimated counter thermal cycling force vectors and any recorded force vectors in a history table for that region, the thermal cycling module estimates the thermal cycling effect of using the estimated counter thermal cycling force vectors would have on the region within the 3D integrated circuit architecture (step 706). Based on the estimated thermal cycling effect, the thermal cycling module determines whether the use of the estimated counter thermal cycling force vectors would reduce the thermal cycling effect being experienced in the region by determining whether the estimated thermal cycling effect is below a predetermined thermal cycling magnitude (step 708). If at step 708 the estimated thermal cycling effect is below the predetermined thermal cycling magnitude, therein there is no change needed and the operation returns to step 702 thereafter in order to evaluate a next region or proceeds to evaluating all of the regions at a next time period. If at step 708 the estimated thermal cycling effect is at or above the predetermined thermal cycling magnitude, then the thermal cycling module sends a notification to the thermal management module with specific values for implementation (step 710). The thermal management module then implements temperature actuation actions in order to meet the values and minimize max force and stress vector values in the 3D integrated circuit architecture (step 712), with the operation returning to step 702 thereafter.

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in act, be executed substantially concurrently, or the blocks may sometimes be executed in the reverse order, depending upon the functionality involved will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for minimizing reliability problems created by mechanical stress and thermal cycling, the illustrative embodiments provide a specialized thermal management technique relies on a sensor infrastructure to keep track of the on-stack temperatures in three-dimensional (3D) integrated circuit architectures at run-time. The illustrative embodiments estimate thermal gradients and corresponding mechanical stress levels for different regions in the stack. After determining the opposing forces for both static and cycling stress, the illustrative embodiments then adjusts parameters, such as voltage, frequency, workload, or the like to minimize the corresponding opposing forces. That is, the illustrative embodiments perform counter intuitive steps, such as increasing activity levels and corresponding heating levels of cooler areas to minimize the thermal gradients both spatially and temporally.

As noted above, it should be appreciated that the illustrative embodiments may take the form of an entirety hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for minimizing reliability problems in a three-dimensional (3D) integrated circuit, the method comprising:

interrogating, by the processor, a set of sensors in the 3D integrated circuit for current data, wherein the 3D integrated circuit comprises two or more layers of active electronic components;

determining, by the processor, a direction of force and a magnitude of the force based on the current data for each sensor in the set of sensors for each of one or more directions between the sensor and at least one neighboring sensor within the 3D integrated circuit architecture thereby forming a set of forces;

using, by the processor, the set of forces to identify one or more points of stress that are at or above the predetermined force threshold; and responsive to identifying at least one point of stress that is at or above the predetermined force threshold, initiating, by the processor, one or more temperature actuation actions within the 3D integrated circuit in order to reduce the at least one point of stress in the region where the at least one point of stress is identified.

2. The method of claim 1, wherein the set of sensors is a set of thermal sensors, wherein the direction of force and the magnitude of force is determined based on a set of thermal gradients between a thermal sensor in the set of thermal sensors and at least one neighboring thermal sensor within the 3D integrated circuit architecture, and wherein the set of thermal gradients is determined by the processor calculating the set of thermal gradients for each thermal sensor in the one or more directions based on the temperature measured by the thermal sensor and at least one temperature measured by at least one neighboring thermal sensor, wherein the one or more directions are at least one of to a side, upward, downward, or diagonally.

3. The method of claim 1, wherein the one or more temperature actuation actions comprises adjusting a voltage level associated with one or more of the active electronic components in the region where the at least one point of stress is identified.

4. The method of claim 1, wherein the one or more temperature actuation actions comprises adjusting a operating frequency associated with one or more of the active electronic components in the region where the at least one point of stress is identified.

5. The method of claim 1, wherein the one or more temperature actuation actions comprises adjusting a workload associated with one or more of the active electronic components in the region where the at least one point of stress is identified.

6. The method of claim 1, wherein the set of sensors is a set of pressure sensors and wherein the direction of force and the magnitude of force is obtained directly from each pressure sensor in the set of pressure within the 3D integrated circuit architecture.

7. The method of claim 2, further comprising:

storing, by the processor, one or more of the set of thermal gradients, the set of forces, or the one or more points of stress for each sensor in the set of sensors in a history table;

determining, by the processor, a set of dynamic characteristics that indicate thermal cycling patterns based on the one or more of the set of thermal gradients, the set of forces, or the one or more points of stress for each sensor in the set of sensors;

responsive to identifying at least one thermal cycling pattern, estimating, by the processor, one or more counter thermal cycling force vectors that would be needed to compensate for the at least one thermal cycling pattern;

estimating, by the processor, a thermal cycling effect of using the estimated one or more counter thermal cycling force vectors would have in the region where the at least one thermal cycling pattern is identified;

determining, by the processor, whether the estimated thermal cycling effect is below a predetermined thermal cycling magnitude; and responsive to the estimated thermal cycling being at or above the predetermined thermal cycling magnitude, initiating, by the processor, one or more temperature actuation actions in order to preemptively minimize max force and stress vector values that may be experienced in the 3D integrated circuit.

8. A computer program product comprising a computer readable storage medium having a computer readable program stored therein, wherein the computer readable program, when executed on a computing device, causes the computing device to:

interrogate a set of sensors in a 3D integrated circuit for current data, wherein the 3D integrated circuit comprises two or more layers of active electronic components;

determine a direction of force and a magnitude of the force based on the current data for each sensor in the set of sensors for each of one or more directions between the sensor and at least one neighboring sensor within the 3D integrated circuit architecture thereby forming a set of forces;

use the set of forces to identify one or more points of stress that are at or above the predetermined force threshold; and responsive to identifying at least one point of stress that is at or above the predetermined force threshold, initiate one or more temperature actuation actions within the 3D integrated circuit in order to reduce the at least one point of stress in the region where the at least one point of stress is identified.

9. The computer program product of claim 8, wherein the set of sensors is a set of thermal sensors, wherein the direction of force and the magnitude of force is determined based on a set of thermal gradients between a thermal sensor in the set of thermal sensors and at least one neighboring thermal sensor within the 3D integrated circuit architecture, and wherein the set of thermal gradients is determined by the processor calculating the set of thermal gradients for each thermal sensor in the one or more directions based on the temperature measured by the thermal sensor and at least one temperature measured by at least one neighboring thermal sensor, wherein the one or more directions are at least one of to a side, upward, downward, or diagonally.

10. The computer program product of claim 8, wherein the one or more temperature actuation actions comprises adjusting a voltage level associated with one or more of the active electronic components in the region where the at least one point of stress is identified.

11. The computer program product of claim 8, wherein the one or more temperature actuation actions comprises adjusting a operating frequency associated with one or more of the active electronic components in the region where the at least one point of stress is identified.

12. The computer program product of claim 8, wherein the one or more temperature actuation actions comprises adjusting a workload associated with one or more of the active electronic components in the region where the at least one point of stress is identified.

13. The computer program product of claim 8, wherein the set of sensors is a set of pressure sensors and wherein the direction of force and the magnitude of force is obtained directly from each pressure sensor in the set of pressure within the 3D integrated circuit architecture.

14. The computer program product of claim 9, wherein the computer readable program further causes the computing device to:
    store one or more of the set of thermal gradients, the set of forces, or the one or more points of stress for each sensor in the set of sensors in a history table;
    determine a set of dynamic characteristics that indicate thermal cycling patterns based on the one or more of the set of thermal gradients, the set of forces, or the one or more points of stress for each sensor in the set of sensors;
    responsive to identifying at least one thermal cycling pattern, estimate one or more counter thermal cycling force vectors that would be needed to compensate for the at least one thermal cycling pattern;
    estimate a thermal cycling effect of using the estimated one or more counter thermal cycling force vectors would have in the region where the at least one thermal cycling pattern is identified;
    determine whether the estimated thermal cycling effect is below a predetermined thermal cycling magnitude; and
    responsive to the estimated thermal cycling being at or above the predetermined thermal cycling magnitude, initiate one or more temperature actuation actions in order to preemptively minimize max force and stress vector values that may be experienced in the 3D integrated circuit.

15. An apparatus for minimizing reliability problems in a three-dimensional (3D) integrated circuit, comprising:
    a thermal control mechanism that interrogates a set of sensors in the 3D integrated circuit for current data, wherein the 3D integrated circuit comprises two or more layers of active electronic components;
    the thermal control mechanism determines a direction of force and a magnitude of the force based on the current data for each sensor in the set of sensors for each of one or more directions between the sensor and at least one neighboring sensor within the 3D integrated circuit architecture thereby forming a set of forces;
    the thermal control mechanism uses the set of forces to identify one or more points of stress that are at or above the predetermined force threshold; and
    the thermal control mechanism, responsive to identifying at least one point of stress that is at or above the predetermined force threshold, initiates one or more temperature actuation actions within the 3D integrated circuit in order to reduce the at least one point of stress in the region where the at least one point of stress is identified.

16. The apparatus of claim 15, wherein the set of sensors is a set of thermal sensors, wherein the direction of force and the magnitude of force is determined based on a set of thermal gradients between a thermal sensor in the set of thermal sensors and at least one neighboring thermal sensor within the 3D integrated circuit architecture, and wherein the set of thermal gradients is determined by the processor calculating the set of thermal gradients for each thermal sensor in the one or more directions based on the temperature measured by the thermal sensor and at least one temperature measured by at least one neighboring thermal sensor, wherein the one or more directions are at least one of to a side, upward, downward, or diagonally.

17. The apparatus of claim 15, wherein the one or more temperature actuation actions comprises adjusting a voltage level associated with one or more of the active electronic components in the region where the at least one point of stress is identified.

18. The apparatus of claim 15, wherein the one or more temperature actuation actions comprises adjusting a operating frequency associated with one or more of the active electronic components in the region where the at least one point of stress is identified.

19. The apparatus of claim 15, wherein the one or more temperature actuation actions comprises adjusting a workload associated with one or more of the active electronic components in the region where the at least one point of stress is identified.

20. The apparatus of claim 15, wherein the set of sensors is a set of pressure sensors and wherein the direction of force and the magnitude of force is obtained directly from each pressure sensor in the set of pressure within the 3D integrated circuit architecture.

21. The apparatus of claim 16, further comprising:
    the thermal control mechanism stores one or more of the set of thermal gradients, the set of forces, or the one or more points of stress for each sensor in the set of sensors in a history table;
    the thermal control mechanism determines a set of dynamic characteristics that indicate thermal cycling patterns based on the one or more of the set of thermal gradients, the set of forces, or the one or more points of stress for each sensor in the set of sensors;
    the thermal control mechanism, responsive to identifying at least one thermal cycling pattern, estimates one or more counter thermal cycling force vectors that would be needed to compensate for the at least one thermal cycling pattern;
    the thermal control mechanism estimates a thermal cycling effect of using the estimated one or more counter thermal cycling force vectors would have in the region where the at least one thermal cycling pattern is identified;
    the thermal control mechanism determines whether the estimated thermal cycling effect is below a predetermined thermal cycling magnitude; and
    the thermal control mechanism, responsive to the estimated thermal cycling being at or above the predetermined thermal cycling magnitude, initiates one or more temperature actuation actions in order to preemptively minimize max force and stress vector values that may be experienced in the 3D integrated circuit.

* * * * *